US011274193B2

(12) United States Patent
Thuresson et al.

(10) Patent No.: US 11,274,193 B2
(45) Date of Patent: Mar. 15, 2022

(54) MODELLING COMPOUND

(71) Applicant: DELTA OF SWEDEN AB, Halmstad (SE)

(72) Inventors: Staffan Thuresson, Halmstad (SE); Jonas Modell, Halmstad (SE); Krister Thuresson, Halmstad (SE)

(73) Assignee: DELTA OF SWEDEN AB, Halmstad (SE)

( * ) Notice: Subject to any disclaimer, the term of this patent is extended or adjusted under 35 U.S.C. 154(b) by 0 days.

(21) Appl. No.: 15/550,748

(22) PCT Filed: Feb. 15, 2016

(86) PCT No.: PCT/EP2016/053196
§ 371 (c)(1),
(2) Date: Aug. 11, 2017

(87) PCT Pub. No.: WO2016/128582
PCT Pub. Date: Aug. 18, 2016

(65) Prior Publication Data
US 2018/0030247 A1 Feb. 1, 2018

(30) Foreign Application Priority Data
Feb. 13, 2015 (GB) ..................................... 1502459

(51) Int. Cl.
| | |
|---|---|
| *C08L 3/12* | (2006.01) |
| *C08L 39/06* | (2006.01) |
| *C08L 83/04* | (2006.01) |
| *C08K 5/00* | (2006.01) |
| *C08K 5/101* | (2006.01) |
| *C08K 3/30* | (2006.01) |
| *C08K 5/103* | (2006.01) |
| *C08L 99/00* | (2006.01) |
| *C08K 5/098* | (2006.01) |
| *C08L 1/28* | (2006.01) |
| *B44C 3/04* | (2006.01) |
| *C08K 3/34* | (2006.01) |
| *C08K 5/053* | (2006.01) |
| *C08K 5/07* | (2006.01) |
| *C08K 5/10* | (2006.01) |
| *C08K 5/20* | (2006.01) |

(52) U.S. Cl.
CPC ................. *C08L 3/12* (2013.01); *B44C 3/04* (2013.01); *C08K 3/30* (2013.01); *C08K 3/34* (2013.01); *C08K 5/0058* (2013.01); *C08K 5/053* (2013.01); *C08K 5/07* (2013.01); *C08K 5/098* (2013.01); *C08K 5/10* (2013.01); *C08K 5/101* (2013.01); *C08K 5/103* (2013.01); *C08K 5/20* (2013.01); *C08L 1/284* (2013.01); *C08L 39/06* (2013.01); *C08L 83/04* (2013.01); *C08L 99/00* (2013.01); *C08L 2205/02* (2013.01); *C08L 2666/66* (2013.01)

(58) Field of Classification Search
CPC .... C08L 3/12; B44C 3/04; C08K 3/34; C08K 5/0058; C08K 5/12; C08K 5/07
USPC ........................................................ 106/125.1
See application file for complete search history.

(56) References Cited

U.S. PATENT DOCUMENTS

| | | | |
|---|---|---|---|
| 3,167,440 A | 1/1965 | McVicker et al. | |
| 4,076,547 A * | 2/1978 | Lester | C08K 5/053 106/175.1 |
| 5,538,551 A | 7/1996 | Desbiens | |
| 5,972,092 A * | 10/1999 | Cordova | C08L 99/00 106/126.3 |
| 6,713,624 B1 * | 3/2004 | Doane, Jr. | C08L 3/00 536/123.1 |
| 2010/0083870 A1 | 4/2010 | Spreuwers | |
| 2010/0251934 A1 | 10/2010 | Smith | |
| 2011/0014534 A1 | 1/2011 | Sung et al. | |
| 2011/0146534 A1 | 6/2011 | Uang | |

FOREIGN PATENT DOCUMENTS

| | | |
|---|---|---|
| CN | 101298222 | 11/2008 |
| CN | 102173266 | 9/2011 |
| CN | 102975553 | 3/2013 |
| CN | 103651654 | 3/2014 |
| EP | 0599535 B1 | 1/1999 |
| EP | 2172514 A1 | 9/2009 |
| JP | H6-234882 | 8/1994 |
| JP | 2003-518541 | 6/2003 |
| JP | 2005021124 A | 1/2005 |
| JP | 200664982 | 3/2006 |

(Continued)

OTHER PUBLICATIONS

Thomas, David J. et al., "Starches", Egan Press Handbook Series. 3:25-30.

(Continued)

*Primary Examiner* — Melissa S Swain
(74) *Attorney, Agent, or Firm* — Jeffrey N. Townes; Cozen O'Connor

(57) ABSTRACT

The present invention relates to modelling doughs comprising;
 a) at least one starch-containing material;
 b) at least on low vapour pressure polar solvent; and
 c) an aqueous component.

Typically the doughs will also contain optional ingredients such as softeners, preservatives and/or additives. The invention further relates to filled doughs comprising the modelling doughs incorporating an inert filler and to methods for the production of both the modelling dough and the filled dough.

23 Claims, No Drawings

(56) References Cited

FOREIGN PATENT DOCUMENTS

| | | |
|---|---|---|
| JP | 2007-528822 | 10/2007 |
| JP | 2009-545658 | 12/2009 |
| KR | 20120034368 | 4/2012 |
| WO | 9404609 A1 | 3/1994 |
| WO | 01/48078 A1 | 7/2001 |
| WO | 0159004 A1 | 8/2001 |
| WO | 2005/010099 A1 | 2/2005 |
| WO | 2008/014573 | 2/2008 |
| WO | 2013158510 A1 | 10/2013 |

OTHER PUBLICATIONS

Stomatology Department of Shanghai Second School of Medicine, "Stomatology Manual," Shanghai Science and Technology Press, p. 698 (Oct. 1982).

\* cited by examiner

MODELLING COMPOUND

CROSS-REFERENCE TO RELATED APPLICATIONS

This application is a 371 National Stage application of International PCT Application No. PCT/EP2016/053196, filed Feb. 15, 2016, which claims priority to British Patent Application No. 1502459.9, filed Feb. 13, 2015, both of which are incorporated herein by reference in their entirety.

FIELD OF THE INVENTION

The invention relates generally to flexible modelling compounds that can be used for extruding, rolling, moulding, or sculpting. In particular the invention relates to starch-based modelling compounds.

BACKGROUND OF THE INVENTION

For more than 50 years starch-based modelling compounds have been known and used (McVicker et al.). The binder in starch-based modelling compounds comes from various sources including flour from wheat, rye, rice, or tapioca. According to methods known in the art, such starch-based binders may be mixed with other components such as water, a salt, a lubricant, and/or a preservative to form a modelling compound.

Previous modelling materials can generally be divided into starch-based doughs and non-drying clays. Starch-based doughs such as Play-Doh® are typically bound with water and susceptible to drying when left uncovered. Conversely, non-drying modelling materials are typically clays which do not offer the same "feel" as doughs in use. Generally non-drying clays such as Plasticine® are based upon a hydrocarbon liquid or wax with a high level of a filler, such as a mineral filler, incorporated. Similar known products include polymer clays such as Fimo®, Sculpey® and Cernit® which are typically based upon PVC, hydrocarbons and plasticising agents. Known non-drying materials, especially those incorporating hydrocarbons tend to leave a residue on the hands after use and can be tacky, especially under warm conditions. Furthermore, starch-based doughs have a more desirable "feel", especially for use by children.

Starch is a polysaccharide produced by most green plants and is the primary source of stored energy in cereal grains. Apart from starch, flour typically contains proteins, dietary fibres, and fat. Starch is a mixture of the water-soluble polysaccharides amylose and amylopectin.

Amylose is comparatively low molecular weight. It is linear, made up of $\alpha(1\rightarrow4)$ bound glucose molecules, and forms helical coils in solution. Amylopectin is highly branched, having a much higher molecular weight and, in solution, a higher viscosity. Glucose units in amylopectin are linked in a linear way ($\alpha(1\rightarrow4)$ glycosidic bonds) while branching takes place with $\alpha(1\rightarrow6)$ bonds occurring every 24 to 30 glucose units.

Dissolved amylopectin starch has lower tendency of retrogradation (gelling) during storage and cooling than amylose rich starch has. Amylose has tendency to retrograde already at concentrations as low as 1% in water.

In starch, amylopectin dominates and is commonly about 70% of the polysaccharide content but amount varies depending on the source. Medium-grain rice has higher ratio of amylopectin, and in glutinous rice it is up to 100%. For example, wheat starch contains about 75% amylopectin; and tapioca starch contains about 83% amylopectin. Waxy corn starch contains more than about 99% amylopectin.

In semicrystalline starch granules, amylose and amylopectin are important components. Heating an aqueous starch solution induces gelatinization, during which the crystal structure of starch granules is disrupted, and the starch granules absorb water and hydrate, and the viscosity of the solution increases (Thomas & Altwell). Directly from the time when a freshly-made starch gel is cooled the retrogradation process starts. This involves reassociation of starch molecules by alignment of linear amylose chains and the linear regions of amylopectin molecules and formation of inter-molecular hydrogen bonds.

All these processes occur in starch-based modelling compounds and affect the characteristics. The texture may go from soft, and easy to manipulate and shape, to being significantly harder within a couple of days. This was addressed by Doane Jr and Tsimberg by adding a retrogradation inhibitor, in an amount of 2-10% to a starch based modelling compound. As retrogradation inhibitor they used amylopectin starch that is known to be resistant to retrogradation.

There is however another drawback with all previously known starch-based modelling compounds. Since they contain large amounts of water (typically 50% or more) as solvent, they dry out and in between use have to be stored in sealed containers. A chunk left exposed to ambient air becomes hard over time (typically a few hours) and play value is lost. It is often very difficult or impossible to regain the texture by adding water as reincorporation of the added water is problematic. This applies not only at low relative humidity but also at normal (40-60%) and even at high relative humidity (e.g. 60% or above). When residues of the modelling compound dries in plastic moulds and extruders, which are used with the dough by children, they get stuck and the moulds and extruders are (very) difficult to clean.

It would be a considerable advantage to provide a modelling compound having enhanced stability of properties. In particular it would be an advantage to provide a modelling compound which was less prone to drying and/or changing properties, particularly when left open to the ambient environment.

It would be an advantage to provide a non-drying or drying-resistant dough that would reduce the problem of dough drying in the moulds and extruders. It would also be an advantage to provide a dough that could be stored without the need for special precautions to avoid drying. In particular, it would be an advantage if a dough did not need to be stored in closed containers. These are obvious advantages for the users, but also manufacturers would not need to pack out the product in airtight containers.

SUMMARY OF THE INVENTION

The present inventors have now established that by formulating a dough with at least one polar liquid having a low vapour pressure, the drying of modelling dough can be dramatically reduced.

In a first aspect, the present invention provides a modelling dough comprising;
 a) at least one starch-containing flour;
 b) at least one low vapour pressure polar solvent; and
 c) an aqueous component.
Optional but preferable components includes one or more of the following;
 d) at least one softening agent;
 e) at least one preservative; and/or
 f) at least one additive.

Generally, the weight of aqueous component c) will be less than the weight of low vapour pressure solvent b).

In a further aspect, the present invention provides a filled modelling dough comprising a modelling dough as described herein and at least one filler material. Typically the filler will be present in an amount of 1 to 40% by weight of the filled dough product. Such a filled dough will comprise any modelling dough described herein with the addition of at least one filler material.

In a further aspect, the present invention provides a method for the formation of a modelling dough as described herein, the method comprising mixing at least one starch-containing flour, at least one low vapour pressure polar solvent and an aqueous component and heating the resulting mixture. The method may be followed by a drying and/or a kneading step.

DETAILED DESCRIPTION OF THE INVENTION

In the modelling doughs of the present invention, component a) is at least one starch-containing material. This will typically be a "flour" ("starch-containing flour"), which term is used herein to indicate any particulate material having a starch content of greater than 60% and an average particle diameter of less than 1 mm. Generally, the "flours" referred to herein throughout will be generated by physical techniques such as milling but may be generated by any other suitable technique including chemical or enzymatic digestion, heat treatment, dissolution and precipitation or any combination of techniques. Typically at least 90% by weight of the flour will fall in the particle size range of 1 μm to 1000 μm. Many suitable starch-containing materials are known in the art and suitable materials and combinations may be readily established. Particularly effective starch-containing material for use in the present invention include wheat flours, rye flours, tapioca flours, maize (corn) flours, potato starch, rice flours and mixtures thereof. Rice flours and mixtures thereof are preferred.

Starch-containing material (e.g. flour) high in amylopectin has advantages in dough formulations. In particular we have found that a dough formulation containing some flour high in amylopectin tends to better resist becoming too soft at high relative humidity. In one embodiment applicable to all aspects of the present invention, component a) may comprise at least one "standard flour" having 60% to 88% amylopectin and at least one "waxy" flour having at least 90% amylopectin. Suitable standard flours may be wheat flours, rye flours, tapioca flours, maize (corn) flours, potato starch, rice flours (especially medium and long-grain rice flours) and mixtures thereof. The proportion of amylopectin in such flours will generally be 60% to 88%, preferably 70% to 85%. Suitable "waxy" flours include waxy corn starch, waxy (glutinous) rice flour (especially rice flour of short- or round-grain rice), waxy potato starch and mixtures thereof. Suitable mixtures may have a "standard flour":"waxy flour" ratio of 95:5 to 5:95, preferably 40:60 to 90:10, most preferably 60:40 to 85:15.

A highly effective combination is a mixture of rice flour (e.g. medium-grain or long-grain rice flour) and glutinous rice flour (e.g. round-grain or short-grain rice flour). Such a mixture may have a rice flour:glutinous rice flour ratio of 95:5 to 5:95, preferably 40:60 to 90:10, most preferably 60:40 to 85:15.

An advantage of rice flour is that it is substantially or completely free of gluten. Even so-called "glutinous rice" does not in fact contain gluten and is suitable for those with a gluten allergy or intolerance. Other gluten-free flours/starches exist (e.g. corn or potato starch) and may be used in all aspects of the present invention but rice flour is highly suitable and readily available. Being essentially free of gluten provides the advantage that dough compositions are suitable for those with gluten allergies and/or gluten intolerance. Generally the doughs of all aspects of the invention are not for consumption but inadvertent or mistaken consumption may be an issue, especially where the dough is used by children. Being essentially gluten free avoids any gluten tolerance issues if the dough should be swallowed. Thus, in one embodiment applicable to all aspects of the invention, the dough may comprise less than 1% by weight gluten (e.g. 0 to 1% by weight or 0.0001% to 1% by weight), preferably less than 0.1% by weight and most preferably less than 0.01% by weight gluten.

The total amount of starch-containing material component a) in the modelling doughs in all aspects of the present invention will typically be in the range 10 to 60% by weight, preferably 15 to 50% by weight and more preferably 25 to 45% by weight. Most preferably the amount of component a) will be 30% to 45% by weight. All percentages indicated herein are expressed as percentages by weight of the final dough product comprising components a) to f), unless indicated otherwise. Likewise, since all percentages relate to a dough containing water, which will affect the weight percentage of other components, the amounts indicated herein may be the equilibrium level in a dough at one or more relative humidity levels within the range of 30% to 70%. In one embodiment the indicated weight percentages will apply at equilibrium at 50% relative humidity.

Percentages of components indicated herein relate to a dough comprising or consisting of components a) to f). Where the dough additionally comprises one or more inert filler components g), the weight of that filler will generally not be taken into account in the amounts indicated here except where explicitly indicated.

Component b) of the modelling compositions will be at least one low-vapour pressure solvent. Generally, any such solvent will have a vapour pressure at 25° C. of less than 2 kPa, preferably less than 1 Ka, and more preferably less than 0.1 kPa (e.g. less than 0.01 kPa). Examples of suitable polar solvents include oxygen-containing organic solvents such as alcohols, glycols (such as propylene glycol), polyols (such as glycerol), ketones, esters, amides, including cyclic compounds, and mixtures thereof. In particular, glycerol has been found to give dough formulations that do not dry. Since the composition also contains water, the low-vapour pressure solvent will generally be at least partially miscible with water. Preferably the solvent will be sufficiently polar to be soluble to at least 10% by weight with water and most preferably will be fully miscible with water. Oxygen-containing organic molecules such as those considered above will be highly suitable, particularly those which comprise at least 10% of their molecular weight oxygen. Solvents such as animal and/or vegetable oils are typically not sufficiently polar to be useful in the present invention.

In one embodiment, the low vapour pressure solvent is not a hydrocarbon solvent such as a mineral oil or paraffin. In a further embodiment, the low vapour pressure solvent is not an animal fat or vegetable fat (e.g. vegetable oil).

The amount of polar low vapour pressure solvent will be sufficient to provide binding and flexibility to the dough product. Typically this will be an amount of around 20% to 70% by weight of the dough, preferably around 30% to around 60% by weight (e.g. 30% to 65% or 32% to 60%).

Amounts around 35% to 55% by weight are highly preferred and 40% to 50% most preferred.

Glycerol is a highly preferred low vapour pressure solvent. Glycerol is available in many purities from around 99.5% pure down to around 86% pure or less. Lower purities contain corresponding amounts of water making up the balance of the material. Any suitable purity level may be used but when calculating the amount of glycerol and aqueous component present in a dough, any significant amount of water in the glycerol material should be accounted for as a reduction in the glycerol component and corresponding increase in the aqueous component.

It has been found that small amount water in the heating step facilitates swelling—that is water is seen as a process solvent. Since water obviously is a solvent and mixes with the dough, the water content, also in the new non-drying dough, will depend on the relative humidity (% RH) in the ambient surroundings. At equilibrium conditions the water content in the dough will be higher at high % RH and be lower at low % RH. It is important to balance the dough properties with the water uptake such that at low % RH the dough is slightly stiffer while at high % RH it is slightly softer. The dough should be pliable and possible to use at all normal and common % RH (e.g. 30% to 70% RH). This % RH-window can be evaluated by storing the dough in climate chambers with humidity controlled to specific % RH:s.

Aqueous component c) of the compositions of the present invention will thus vary somewhat depending upon the conditions of manufacture and storage but will typically be present at around 1 to 45% by weight, preferably around 5 to 35% by weight, more preferably around 10 to 30% by weight of the total composition (e.g. 10 to 20% or 15 to 30% by weight). This amount may be reduced in low relative humidity environments and greater at high relative humidity and the amounts indicated herein may be the equilibrium level in at one or more relative humidity levels within the range of 30% to 70%. In one embodiment the indicated aqueous content will apply at equilibrium at 50% relative humidity. The aqueous component will typically be water.

As mentioned above, flour high in amylopectin has advantages in dough formulations. In particular we have found that a dough formulation containing some flour high in amylopectin tends to resist high % RH better. The drawback is an (excessively) elastic texture at low % RH. The elasticity can be decreased, and sometimes completely opposed, by adding an optional softening agent. Such softening agents are optional but may be used in all aspects of the present invention including those embodiments where at least a part of component a) is a high amylopectin flour such as glutinous rice flour, waxy corn starch (waxy corn flour) or waxy potato starch.

The optional softening agents can be certain semi-organic compounds such as siloxanes (e.g. polydimethylsiloxane), certain organic compounds such as glycerides (mono-, di-, tri-, or mixtures of them), or certain inorganic compounds such as salts (exemplified with NaCl or potassium aluminium sulphate). It appears that alum (potassium aluminium sulphate) can, at low % RH give a more pliable dough, at the same time give the dough better resistance against softening at high % RH. The reference sample (without alum) is stiff and elastic at low % RH and too soft and tacky at high % RH. Mixtures of such optional softening agents will frequently provide beneficial results. Where present, the total content of softening agents (component d)) will be included at a level of less than 20%, such as less than 15% by weight (e.g. 1% to 20% or 1% to 15% by weight), preferably less than 10% and more preferably less than 8% by weight. Each individual softening agent will typically be present at less than 15% (e.g. 1% to 15%), more preferably less than 10% by weight.

Typical organic compounds will be of low molecular weight, such as less than 2000 amu, preferably less than 1000 amu. The organic compounds will generally be non-toxic and may be derived from natural sources. Lipids and their derivatives will be typical organic compounds for use as softening agents. Generally the organic compounds will not be hydrocarbons. More commonly they will include at least one oxygen in the molecular structure. Halogenated organic molecules are less preferred.

Glyceride softening agents form a preferred embodiment suitable for all aspects of the invention. Suitable glycerides include a glycerol polar "head" moiety and one, two or three non-polar "tail" moieties, typically joined by an ester linkage. Suitable non-polar moieties include saturated and unsaturated fatty acids such as C8 to C24 fatty acids. Specific examples include non-polar chains based on natural fatty acids including caproic, caprylic, capric, lauric, myristic, palmitic, phytanic, palmitolic, stearic, oleic, elaidic, linoleic, linolenic, arachidonic, behenic or lignoceric acids. Preferable non-polar chains are based upon (esters of) palmitic, stearic, oleic and linoleic acids, particularly oleic acid. Mixtures of glycerols are evidently suitable and in di- or tri-acyl glycerols, each non-polar group may be selected independently. Mono-acyl glycerols are highly preferred, such as glycerol monooleate, glycerol monolinoleate, glycerol monosterate, glycerol monopalmitate and mixtures thereof. Glyceryl tricaprylate/caprate and related lipids, particularly with caproic, caprylic, capric, lauric chains form a further preferred example.

Mono-acyl glycerols form a group of highly beneficial softening agents which have been found to provide surprising benefits in all aspects of the present invention. Glycerol monooleate (GMO) and other monoacyl glycerols are known to generate liquid crystalline phase structures upon contact with water or polar solvents (such as those used in the present invention) and these structures are typically highly bioadhesive. The present inventors have, however, surprisingly observed that when adding glycerol monooleate (GMO) one might believe that the dough would become more sticky to the hands (since the liquid crystalline phases are generally bioadhesive). The inventors have found the opposite, and GMO acts as a "release agent" such that the dough with GMO (typically at 0.1% to 10% by weight) does not stick to hands or process equipment and adheres much less than a comparative sample without GMO. This feature is believed to apply to comparable monoacyl glycerols (e.g. those with acyl chains as described herein) and to mixtures of such monoacyl glycerols with diacyl glycerols (again, particularly those with acyl chains as described herein). In one embodiment applicable to all aspects of the present invention, the doughs may therefore comprise at least one monoacyl glycerol, preferably a monoacyl glycerol having at least 80% acyl chains as described herein above. Glycerol monooleate (GMO) is a highly preferred example. Where GMO is used in the doughs of the present invention, it will typically be of high purity in order to achieve the best non-sticking effect. Thus a GMO component containing at least 70% glycerol monoleate, preferably at least 80% will be preferred.

In a corresponding embodiment applicable to all aspects of the present invention, the doughs may comprise at least one monoacyl glycerol and at least one diacyl glycerol (e.g. in a ratio 95:5 to 5:95 by weight, preferably, 30:70 to 70:30 by weight). In the case of both the mono-acyl and di-acyl component, these will preferably have at least 80% acyl chains as described herein above. "mono- and diglycerides of fatty acids" is a food-safe emulsifier designated E471. Such a mixture may be used. In a highly preferred embodiment both a monoglyceride (e.g. GMO) and a mono/di glyceride mixture (e.g. E471) may be used.

The present inventors have additionally established that the use of mixtures of mono- and di-glycerides (such as E471) may provide an excellent texture to the modelling dough of all embodiments of the invention. In particular, the use of such mixture, especially in combination with a mono-acyl glycerol (such as GMO) may provide excellent workability of the dough after standing for long periods (e.g. 3 days or more).

Any non-toxic salts may potentially be included in the softening agents, although these will typically be water soluble. Non-toxic or low-toxicity sodium, aluminium, calcium or potassium salts are preferred, including chlorides, carbonates, sulphates, phosphates, acetates etc. Sodium chlorine, potassium chloride, aluminium sulphate, potassium aluminium sulphate and similar salts are highly appropriate, especially potassium aluminium sulphate.

Another surprising observation made by the present inventors is that salts as indicated herein, and alum in particular, seems to decrease the changes in texture of the dough with a variation in % RH, such that the dough becomes softer at low % RH and at the same time retains texture better at high % RH. (All compared to a reference sample without alum). Without being bound by theory, this is believed to be related to the high "salt out" effect, according to the lyotropic (or Hofmeister) series. Thus in one embodiment, the doughs may contain at least one salt comprising anions up to and including chloride in the lyotropic series (e.g. sulphate, phosphate, acetate and/or chloride). Similarly, in one embodiment, the doughs may contain at least one salt comprising cations up to and including sodium in the lyotropic series (e.g. ammonium, potassium, and/or sodium). Evidently such anions and cations may both be present and preferably will be. Such salts may be present at up to around 15% by weight, preferably up to around 12% by weight such as 1 to 12% or 5 to 10% by weight.

Certain other components (additives—component f) herein) may also be present in the doughs of all aspects, typically in the modelling doughs in amounts less than 10% (e.g. 0.01 to 10%) by weight, preferably less than 5% (e.g. 0.01 to 5% or 0.1 to 4%) by weight. Such components include many that are well known in the art as appropriate for modelling compositions including surfactants (e.g. PEG esters of steric acid, PEG esters of lauric acid, ethoxylated alcohols, PEG sorbitan esters such as PEG sorbitan mono oleate, PEG sorbitan monosterate PEG sorbitan mono laurate)), aromas or perfumes (such as perfume oils or essential oils), colours (such as non-toxic, food dyes), preservatives, salt, drying agents, hardeners, astringent agents, lubricants (e.g. mineral oil, preferably at less than 5%, more preferably at less than 2% or less than 1% or propylene glycol), fillers etc.

One advantage of including a surfactant as component f) is to improve compatibility between the main components and various additives, and to avoid demixing and separation into different phases during storage which would compromise material properties. The surfactants described herein, as well as hydrophobically modified polymers (for example hydrophobically modified cellulose derivatives, hydrophobically modified polyacrylates etc.) may be used for this purpose.

The additives of component f) may also be used to modify texture of the dough. Polymers are well-known for use in modifying viscosity and elasticity, and in the present invention many polymers may be compatible with the "aqueous component" c) and the "low vapor pressure polar solvent" b). The polymers mentioned herein above are among those which are suitable for this purpose. Others include non-ionic or ionic (cationic and anionic) polymers such as cellulose derivatives (cf. hydroxyethylcellulose, ethylhydroxyethylcellulose, methylcellulose, carboxymethyl cellulose, quaternary ammonium modified celluloses); chitosan; various homopolymers (for instance polyacrylic acid; various polyacrylates; polyvinyl alcohol; poly(N-isopropylacrylamide); polyacrylamide; polyethylene oxide; polyvinyl pyrrolidone, poly(dimethyldiallylammonium chloride), etc.) and copolymers (for instance various polyetyleneoxide polymers copolymerized with propyleneoxide, ethylene butylene, caprolactone; polyvinylacetate-co-vinylalcohol etc.).

Many suitable preservative agents (component e)) are known in the art and will frequently only be necessary when the preservative function is not provided by another component, such as the salt or organic molecule. Preservative component e) may therefore be either present or absent. Where present, suitable preservatives include sodium benzoate methylparaben (E number E218), ethylparaben (E214), propylparaben (E216), butylparaben and heptylparaben (E209). Less common parabens include isobutylparaben, isopropylparaben, benzylparaben and their sodium salts. The compositions may be resistant to fungal growth in the absence of any specific or added preservative at low to medium relative humidities. For example, the compositions may be stable to fungal growth for at least 1 month, preferably at least 2 months at relative humidities of at least 50%, preferably at least 60% and preferably at humidities of up to 70% RH.

Preferred ranges of specific softening agents found to be particularly useful in the methods of the present invention include 0.2 to 3%, preferably 0.5 to 2% GMO, 1 to 5%, preferably 2 to 4% PDMS, 0.5 to 10%, preferably 1 to 3.5% alum and/or 0.5 to 5%, preferably 1 to 3% E471. These agents in the ranges indicated may be used individually or in any combination and may all be used in the same modeling dough product.

Preservative component e), when present, will be at a level suitable to provide inhibition of microbial growth. Such an amount will typically be less than 3% by weight (e.g. 0.01 to 3% by weight), preferably less than 2% or less than 1% by weight (e.g. 0.01 to 1% by weight).

The filled doughs described herein comprise the modelling doughs with the addition of component g)—at least one filler. Such a filler may be used to reduce sagging, improve texture and embossing properties and/or to give a non-shiny look (matting effect). Fillers are also useful in reducing the production cost by weight of material without sacrificing usability. Filled doughs tend to be a little more dry and "short" (crumbly) than the modelling doughs of the invention but that does not typically hinder usability and may be an advantage in some mixtures.

Suitable fillers will be selected as being invert and non-toxic in use and may include least one filler selected from titanium dioxide, myanite, calcium carbonate, fumed silica, precipitated silica, silicas, alumino silicates, alumina, dolomite, calcium-magnesium silicate, talc, calcium-magnesium carbonate and similar well known fillers. Talc is a preferred filler.

Another particle/filler that can add large volume at low weight addition is plastic-encapsulated gas filler, such as gas-containing plastic microspheres. A typical example is Expancell (see https://www.akzonobel.com/expancel/). Such a filler can provide anti-sagging properties to detailed molded structures and also reduce the density of the dough.

The filled dough of the present invention will comprise 60 to 99% of a modelling dough as described in any embodiment herein (preferably any of the preferred embodiment as described herein) and 1 to 40% by weight filler (such as those indicated above). The filled dough will preferably comprise 5% to 30% filler, more preferably 10 to 25% filler by weight.

In the methods of the present invention, the mixing step may be carried out by any appropriate means of mechanical mixing, such as a commercial dough-mixer. The heating step may also be carried out using established means such as combustion heating, electrical heating or heating with a medium such as steam. Heating will typically be to at least 70° C. (e.g. 70 to 120° C., preferably 70 to 99° C.), preferably at least 80° C. and more preferably 85 to 99° C. A most preferable temperature range is 90 to 99° C. The heating period will typically be for around 5 minutes to around 4 hours, preferably for around 10 minutes to around 60 minutes.

The method of the present invention relies on heating a mixture of the starch-containing material (e.g. component a) as described in any embodiment herein) and the low vapour pressure liquid (e.g. component b) as described in any embodiment herein). An aqueous component (e.g. c) as described herein) may optionally be present during the heating step. Typically the amount of aqueous component will be greater during the manufacturing process than would be required in the final modelling dough product. This additional water aids swelling of the starch-containing material, particularly at lower temperatures. Thus, while the components added in the methods of the present invention will generally be in the amounts indicated for the final product, these may be reduced somewhat in % terms by the addition of up to 20% by weight additional water. Thus, the weight percentage amounts of any other components indicated herein may be reduce by up to 20% in the methods of the invention. This allows for the correct ratio of each component after the evaporation of up to 20% by weight excess water.

Heating to higher temperatures (e.g. above 100° C.) allows for lesser amounts of water to be included in the formulation for heating. However, the formulations will typically gain or lose water once they are allowed to equilibrate at ambient temperature and humidity. Unlike conventional doughs, the modelling doughs of the present invention are pliable and retain good modelling properties when the water content has equilibrated at ambient temperature and humidity (e.g. at 25° C. and 30% to 70% relative humidity).

Where the method of the invention involves heating to greater than 99° C., this will generally be conducted in sealed and/or pressurised heating vessels to reduce the loss of water during heating.

In one embodiment, one or more of the starch-containing material, the low-vapour pressure solvent and/or the aqueous (and optionally additive) component (e.g components a) to c) (or a) to d) where d) is present) may be pre-heated to a temperature below that required for gelatination of the starch (e.g. between 40 and 68° C., preferably between 50 and 65° C.). Where such a pre-heating step takes place, heating to at least 70° C. (as above) may take place for around 5 to 60 minutes, preferably 5 to 30 minutes.

EXAMPLES

The invention will now be illustrated by reference to the following non-limiting examples:

Materials:

| Material No. | Type | Source |
|---|---|---|
| 1. | Glycerol | Glycerol 99.5 CP, AarhusKarlshamn Sweden AB |
| 5. | GMO | Danisco Dimodan MO 90/D |
| 6. | PDMS | Wacker Silicone fluid in AK-series (for instance AK5, AK35, or AK100 - the numbers correspond to the viscosity in cP) |
| 7. | Glyceryl tricaprylate-caprate | Grindsted MCT 60 X |
| 8. | Alum | Alun, APL Pharma Specials |
| 9. | Mono-diglyceride (E471) | GRINDSTED ® MONO-DI MO 40-M KOSHER or Grindstedt mono-di R50 |
| 12. | Talc | Finntalc M15, Omya AB, Sweden |
| 13 | Sodium benzoate | Probenz, Eastman Chemicals |
| 14 | Ethylparaben | Solbrol A, Lanxess Distribution GmbH |
| 15 | Methylparaben | Solbrol A, Lanxess Distribution GmbH |
| 16 | Ethylhydroxyethyl cellulose | BERMOCOLL E 230 X, Akzo Nobel |
| 17 | Polyvinylpyrrolidone | Luvitec K30, BASF |

Example 1

| | |
|---|---|
| 1. Glycerol | 120 g |
| 2. Water | 60 g |
| 3. Rice flour | 75 g |
| 4. Glutinous rice flour | 25 g |
| 5. Glycerol monooleate | 3.7 g |
| 6. Short chain PDMS (in the approximate viscosity range 5-100 cP) | 3.7 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water evaporated while glycerol monooleate (5) and short chain PDMS (6) (polydimethyl siloxane) were added and the dough kneaded to a final product. Before adding glycerol monooleate (5) and short chain PDMS (6) the dough was too elastic and too sticky and tacky, while after the addition at 40% RH it was less elastic and less sticky/tacky and had good dough properties. At 70% RH it was more soft and tacky than desired.

Long term storage for several months in indoor climate did not change the formulation and it did not dry out. A commercial modelling dough (Play-Doh®) sample stored in the same way for the same time dried out was found to be hard and could not be used for modelling purposes.

Example 2

| | |
|---|---|
| 1. Glycerol | 130 g |
| 2. Water | 60 g |
| 3. Rice flour | 75 g |
| 4. Glutinous rice flour | 25 g |
| 5. Glycerol monooleate | 7.3 g |
| 7. Glyceryl tricaprylate-caprate | 15 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water evaporated while glycerol monooleate (5) and glyceryl tricaprylate-caprate (7) were added and the dough kneaded to a final product.

Before adding glycerol monooleate (5) and glyceryl tricaprylate-caprate (7) the dough was too elastic and too sticky and tacky, while after the addition at 40% RH it was less elastic and less sticky/tacky and had good dough properties. At 70% RH it was more soft and tacky than desired.

Long term storage for several months in indoor climate did not change the formulation and it did not dry out. A commercial modelling dough (Play-Doh®) sample, stored in the same way for the same time, dried out and was found to be hard and could not be used for modelling purposes.

Example 3

| | |
|---|---|
| 1. Glycerol | 130 g |
| 2. Water | 60 g |
| 3. Rice flour | 75 g |
| 4. Glutinous rice flour | 25 g |
| 5. Glycerol monooleate | 3.7 g |
| 7. Glyceryl tricaprylate-caprate | 3.7 g |
| 8. Alum | 3.7 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water evaporated while glycerol monooleate (5) and glyceryl tricaprylate-caprate (7) were added and the dough kneaded. Alum dissolved in a small amount of water was added and the dough kneaded to a final product.

The dough had good properties and was not too elastic at 40% RH. Additionally, at 70% RH, it also had good properties and was not too soft or too tacky.

Long term storage for several months in indoor climate did not change the formulation and it did not dry out. A commercial modelling dough (Play-Doh®) sample, stored in the same way for the same time, dried out and was found to be hard and could not be used for modelling purposes.

Example 4

Very high amounts of alum are possible to use and mono-diglyceride can be used to control texture. Pigment and aroma can be added to obtain more consumers oriented products.

| | |
|---|---|
| 1. Glycerol | 130 g |
| 2. Water | 65 g |
| 3. Rice flour | 70 g |
| 4. Glutinous rice flour | 30 g |
| 5. Glycerol monooleate | 2.5 g |
| 6. Short chain PDMS (in the approximate viscosity range 5-100 cP) | 15 g |
| 8. Alum | 45 g |
| 9. Mono-diglyceride (E471) | 4.5 |
| 10. Fluorescent pigment (green from the Radiant GWT-series) | 2.5 g |
| 11. *Vanilla* aroma | 0.4 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water evaporated while glycerol monooleate (5) and short chain PDMS (6) were added and the dough kneaded. Solid alum (8) and mono-diglyceride (9) were added and the dough kneaded. Pigment (10) and aroma (11) were added to obtain a final colourful product with pleasant smell.

Although somewhat short and crumbly the dough had fair properties and was not too elastic at 40% RH. Additionally, at 70% RH it also had good properties and was not too soft or too tacky. A somewhat grainy texture may indicate that all alum was not dissolved.

Long term storage for several days in indoor climate did not change the formulation and it did not dry out.

Example 5

A higher preparation temperature enables use of lower amount of flour.

| | |
|---|---|
| 1. Glycerol | 130 g |
| 2. Water | 65 g |
| 3. Rice flour | 50 g |
| 4. Glutinous rice flour | 25 g |
| 5. Glycerol monooleate | 2.5 g |
| 6. Short chain PDMS (in the approximate viscosity range 5-100 cP) | 10 g |
| 10. Fluorescent pigment (green from the Radiant GWT-series) | 1.5 g |

Glycerol (1) and water (2) were mixed, and rice flour (3 and 4) was dispersed in the liquid. The dispersion was enclosed in an air-tight plastic bag and heated to about 111 degree C. until the flour had thickened the liquid. The plastic bag was opened and the excess process water evaporated while glycerol monooleate (5) and short chain PDMS (6) were added and the dough kneaded. Pigment (10) was added to obtain a final colourful product.

The dough had good properties and was not too elastic at 40% RH. At 70% RH the texture was not optimal and was somewhat too soft and too tacky.

Long term storage for several days in indoor climate did not change the formulation and it did not dry out.

Example 6

GMO is important to give anti-stick properties, a property that cannot fully be obtain by replacing GMO with mono-diglyceride.

| | |
|---|---|
| 1. Glycerol | 130 g |
| 2. Water | 65 g |

-continued

| | |
|---|---|
| 3. Rice flour | 70 g |
| 4. Glutinous rice flour | 30 g |
| 8. Alum | 4.5 g |
| 9. Mono-diglyceride (E471) | 4.5 |
| 10. Fluorescent pigment (green from the Radiant GWT-series) | 2.5 g |
| 11. *Vanilla* aroma | 0.4 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water was evaporated while mono-diglyceride (9) was added and the dough kneaded. Alum (8) dissolved in water was added and the dough kneaded. Pigment (10) and aroma (11) were added to obtain a final colourful product with pleasant smell.

The dough had a pleasant texture and was not too elastic at 40% RH, while it was sticky to hands and to process equipment.

Adding a 4.5 g GMO at a this later stage did not repair the properties, at least not immediately.

Long term storage for several days in indoor climate was possible without the formulation drying out.

Example 7

High amounts of GMO can be added without the anti-stick properties being lost.

| | |
|---|---|
| 1. Glycerol | 130 g |
| 2. Water | 65 g |
| 3. Rice flour | 70 g |
| 4. Glutinous rice flour | 30 g |
| 5. Glycerol monooleate | 25 g to 65 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water evaporated while GMO (5) was added and the dough kneaded. The high GMO content changed the texture from dough like to clay like, with a pleasant texture that was completely un-elastic and had a "dead" feeling. The more GMO was added the more accentuated were the clay-like properties. Quit unexpectedly the formulation was non-sticky to hands and to process equipment even at the maximum GMO level.

Long term storage for several days in indoor climate was possible without the formulation drying out.

Example 8

Mono-diglyceride is an effective softener and texture provider.
Basic Recipe:

| | |
|---|---|
| 1. Glycerol | 130 g |
| 2. Water | 65 g |
| 3. Rice flour | 70 g |
| 4. Glutinous rice flour | 30 g |
| 5. Glycerol monooleate | 4.5 g |

Glycerol (1) and water (2) were mixed, and rice flour (3 and 4) was dispersed in the liquid. The dispersion was enclosed in an air-tight plastic bag and heated to about 92 degree C. until the flour had thickened the liquid. The plastic bag was opened and the excess process water evaporated while GMO (5) was added and the dough kneaded. The formulation was non-sticky to hands and to process equipment with a somewhat too elastic and stiff texture.

Adding 2.25 g Mono-diglyceride (E471) to half of the amount of the dough (basic recipe), and kneading this into the formulation give a dough with good properties that was not too elastic at 40% RH.

Adding an extra 2.25 g glycerol (1) to the other half of the dough (basic recipe), and kneading this into the formulation did not give the improved properties that were seen by adding mono-diglyceride.

A common observation after storage for several weeks was that the dough had to be kneaded and worked with for a minute or so before the texture was returned to optimal, and the formulation was often slightly too hard right from start. With mono-diglycerid in the formula this is opposed and the dough has the appropriate properties virtually from start.

This shows that mono-diglycerid provides texture to the dough in another way than the solvent glycerol does.

Example 9

| | |
|---|---|
| 1. Glycerol | 130 g |
| 2. Water | 65 g |
| 3. Rice flour | 70 g |
| 4. Glutinous rice flour | 30 g |
| 5. Glycerol monooleate | 2.5 g |
| 6. Short chain PDMS (in the approximate viscosity range 5-20 cP) | 8.0 g |
| 8. Alum | 4.5 g |
| 9. Mono-diglyceride (E471) | 4.5 |

Glycerol (1) and water (2) were mixed, and rice flour (3 and 4) was dispersed in the liquid. The dispersion was enclosed in an air-tight plastic bag and heated to about 98 degree C. until the flour had thickened the liquid. The plastic bag was opened and the excess process water was evaporated while glycerol monooleate (5) was added and the dough kneaded. GMO provided a dough that did not stick to hands or to process equipment. Short chain PDMS (6) was added to provide anti-tacking properties, alum (8) was added to retain pleasant dough properties in an extended % RH window, and mono-diglyceride (9) was added to provide softness and an appropriate texture to the dough.

Example 10

| | |
|---|---|
| 1. Glycerol | 130 g |
| 2. Water | 65 g |
| 3. Rice flour | 70 g |
| 4. Glutinous rice flour | 30 g |
| 5. Glycerol monooleate | 2.5 g |
| 6. Short chain PDMS (approx' viscosity range 5-100 cP) | 8.0 g |
| 8. Alum | 4.5 g |
| 9. Mono-diglyceride (E471) | 4.5 |
| 12. Talc | 50.0 g |

Glycerol (1) and water (2) were mixed, and rice flour (3 and 4) was dispersed in the liquid. The dispersion was enclosed in an air-tight plastic bag and heated to about 98 degree C. until the flour had thickened the liquid. The plastic bag was opened and the excess process water was evaporated while glycerol monooleate (5) was added and the dough kneaded. GMO provided a dough that did not stick to hands or to process equipment. Short chain PDMS (6) was added to provide anti-tacking properties, alum (8) was added to retain pleasant dough properties in an extended % RH window, and mono-diglyceride (9) was added to provide softness and an appropriate texture to the dough. Talc (12) was finally added in order to add visual matting effect and improved detail pick up on imprints. It was observed that the dough could incorporate substantial amounts of filler while maintaining good modelling properties. The more filler that was added the shorter the dough became. The result remained a non-drying dough with good play behaviour.

Example 11

| | |
|---|---|
| 1. Glycerol | 120 g |
| 2. Water | 60 g |
| 3. Rice flour | 75 g |
| 4. Glutinous rice flour | 25 g |
| 5. Glycerol monooleate | 3.7 g |
| 6. Short chain PDMS (in the approximate viscosity range 5-100 cP) | 3.7 g |

First a dough was prepared with components one to six following the method in Example 1. One third of the sample was kept as is. To one third was added and dissolved into the matrix by kneading:
13. Sodium benzoate perseverative 0.5 g, corresponding to about 0.5% of the final material
17. Polyvinylpyrrolidone polymer 1 g, corresponding to about 1% of the final material
To the final third of the sample was added and dissolved into the matrix by kneading:
14. Ethylparaben perseverative 0.15 g, corresponding to about 0.15% of the final material
15. Methylparaben perseverative 0.15 g, corresponding to about 0.15% of the final material
16. Ethylhydroxyethyl cellulose 0.15 g, corresponding to about 0.15% of the final material The three samples were stored at room temperature at high relative humidity (close to 100% RH) in a bucket. After two months the sample without preservative was completely covered with a biofilm of growing material (bacteria, mold, or fungi), while the sample with sodium benzoate had less growth and the sample with methylparaben and ethylparaben appeared free from growth. This example shows that polymer and preservatives are compatible with the matrix and that addition of preservative may be needed if the material is exposed to very high relative humidity.

Note that a complementary experiment has demonstrated that with a sample containing no added preservative agent, there is no growth of bacteria, mould, or fungi at lower (<70% RH) relative humidity: A chunk of the dough (components 1 to 5) without preservative was stored at a relative humidity of 70% RH in a climate chamber. No growth could be observed after storage for two months.

REFERENCES

McVicker et al., U.S. Pat. No. 3,167,440
David J. Thomas & William Altwell, Starches (1999)
L. E. Doane Jr and L. Tsimberg, U.S. Pat. No. 6,713,624 B1

The invention claimed is:

1. A non-drying modelling dough comprising;
 a) at least one starch-containing material;
 b) at least one low vapor pressure polar solvent; and
 c) an aqueous component,
 wherein the weight of the aqueous component c) is less than the weight of the total amount of the at least one low vapor pressure polar solvent b);
 wherein the total amount of the at least one low vapor pressure polar solvent b) is in the range of 20% to 70% by weight;
 wherein the total amount of the at least one starch-containing material a) is in the range of 15% to 60% by weight; and
 wherein the modelling dough is non-drying.

2. The modelling dough of claim 1, further comprising at least one of the following:
 d) at least one softening agent;
 e) at least one preservative;
 f) at least one additive.

3. The modelling dough of claim 1, wherein the at least one starch-containing material a) comprises at least one "standard flour" having 60% to 88% amylopectin and at least one "waxy flour" having at least 90% amylopectin.

4. The modelling dough of claim 3, wherein the "standard flour" is selected from the group consisting of wheat flours, rye flours, tapioca flours, maize (corn) flours, potato starch, rice flours and mixtures thereof.

5. The modelling dough of claim 3, wherein the "waxy flour" is selected from the group consisting of waxy corn starch, waxy (glutinous) rice flour, waxy potato starch and mixtures thereof.

6. The modelling dough of claim 3, having a "standard flour":"waxy flour" ratio of 95:5 to 5:95.

7. The modelling dough of claim 1, wherein the at least one starch-containing material a) comprises a mixture of rice flour and glutinous rice flour.

8. The modelling dough of claim 1, wherein the total amount of the at least one starch-containing material a) is in the range of 15% to 50% by weight.

9. The modelling dough of claim 1, wherein the at least one low vapor pressure polar solvent b) is selected from the group consisting of alcohols, glycols, polyols, ketones, esters, amides, including cyclic compounds, and mixtures thereof.

10. The modelling dough of claim 1, wherein the at least one low vapor pressure polar solvent b) is glycerol.

11. The modelling dough of claim 1, wherein the aqueous component c) is in the range of 5% to 45% by weight.

12. The modelling dough of claim 2, wherein the at least one softening agent d) is present and is selected from the group consisting of at least one siloxane, at least one salt, at least one lipid, and mixtures thereof.

13. The modelling dough of claim 2, wherein the at least one softening agent d) is present and comprises polydimethylsiloxane, GMO and/or potassium aluminium sulphate.

14. The modelling dough of claim 2, wherein the at least one softening agent d) is present in a total amount of 1% to 15% by weight.

15. A filled dough comprising a modelling dough of claims 1, and 15% to 40% by weight of at least one filler material.

16. A method for preparing a modelling dough comprising:
 i) mixing at least one starch-containing component and at least one low vapor pressure polar solvent; and
 ii) heating the resulting mixture to produce a non-drying modelling dough of claim 1.

17. The method of claim 16, wherein step i) comprises mixing at least one starch-containing material, at least one low vapor-pressure polar solvent, and an aqueous component.

18. The method of claim 16, further comprising;
iii) kneading the heated mixture; and
iv) optionally drying the heated mixture.

19. The method of claim 16, wherein step ii) is carried out at 70 to 99° C. for between 5 minutes and 4 hours.

20. The method of claim 17, further comprising the step of allowing the aqueous component to evaporate at a relative humidity of 30 to 70%.

21. The method of claim 16, further comprising the step of mixing in a softening agent such as GMO, E471, alum and/or PDMS.

22. The method of claim 16, further comprising the step of mixing in a softening agent such as GMO, E471, alum and/or PDMS.

23. The modeling dough of claim 1, wherein the modelling dough is pliable when the water content has equilibrated at ambient temperature and humidity.

\* \* \* \* \*